(12) United States Patent
De Sisti

(10) Patent No.: US 6,365,073 B1
(45) Date of Patent: Apr. 2, 2002

(54) PROCESS FOR HOT OR COLD-WORKING PRISMS INTO A METHACRYLATE OPTIC CONDUCTOR

(76) Inventor: Fabio De Sisti, via Bettolo 6, Rome (IT), 00195

(*) Notice: Subject to any disclaimer, the term of this patent is extended or adjusted under 35 U.S.C. 154(b) by 0 days.

(21) Appl. No.: 09/509,026

(22) PCT Filed: Oct. 19, 1998

(86) PCT No.: PCT/IT98/00287

§ 371 Date: Mar. 21, 2000

§ 102(e) Date: Mar. 21, 2000

(87) PCT Pub. No.: WO00/05605

PCT Pub. Date: Feb. 3, 2000

(30) Foreign Application Priority Data

Jul. 21, 1998 (IT) .................................. PCT/IT98/00203

(51) Int. Cl.⁷ ................................................. B29D 11/00
(52) U.S. Cl. ....................... 264/1.24; 264/1.25; 264/2.7
(58) Field of Search ........................ 264/1.1, 2.7, 1.25, 264/1.24, 285, 293; 425/808, 385, 392

(56) References Cited

U.S. PATENT DOCUMENTS

| | | | |
|---|---|---|---|
| 4,223,050 A | | 9/1980 | Nyfeler et al. |
| 4,234,907 A | | 11/1980 | Daniel |
| 4,765,701 A | * | 8/1988 | Cheslak |
| 5,249,359 A | | 10/1993 | Schubert et al. |
| 5,432,876 A | * | 7/1995 | Appledorn et al. |
| 5,659,643 A | | 8/1997 | Appeldorn et al. |

FOREIGN PATENT DOCUMENTS

| | | |
|---|---|---|
| EP | 0 594 089 | 4/1994 |
| EP | 0 683 404 | 11/1995 |

* cited by examiner

*Primary Examiner*—Mathieu D. Vargot
(74) *Attorney, Agent, or Firm*—Young & Thompson

(57) ABSTRACT

A process for cold- and hot-working of methacrylate optic conductors (M), of cylindric or of any other shape, that allows a beam of light, inserted into said conductors, to be totally inwardly reflected according to the angles contained in the limit angle of the total internal reflection, and determines the emission according to beam angles—in theory—180° amplitude but, in the practical industrial realizations, of 30° or 56°, from the section of the conductor opposed to the one carrying the reflection means (2).

5 Claims, 6 Drawing Sheets

PROCESS FOR HOT OR COLD-WORKING PRISMS INTO A METHACRYLATE OPTIC CONDUCTOR

BACKGROUND OF THE INVENTION

The present invention concerns a cold realization and hot coinage process of prisms onto methacrylate optic conductors, and derived products.

It is well known that methacrylate optic conductors conduct the light radiation according to the principle of the limit angle and of the total reflection.

It is the aim of the present invention to realize a working process for said optic conductors, of cylindric or of any othe shape, that allows a beam of light, inserted into said conductors, to be totally inwardly reflected according to the angles contained in the limit angle of the total internal reflection, and such as to determine the emission according to beam angles until—in theory—180° amplitude but, in the practical industrial realizations, of 30° or 56°, from the section of the conductor opposed to the one carrying the reflection means.

The aim set forth is reached, according to the present invention, by a cold-working, comprising one or more constant pitch millers for the realization of a plurality of parallel specular prisms with a perfectly plane and bright surface, engraved onto the surface of the optic methacrylate conductor; or by hot-working, with a tool consisting of a copper parallelepiped, inside crossed by resistances and thermostats which allow a controlled heating, and of an engraving area that coins the micro-prisms onto the bar. The advantages deriving from the present invention are many and considerable:

- with the hot- or cold engraving of prisms onto conductors with round square section, beam emissions may be obtained according to adjustments of 30° and 56° from the section of the conductor opposed to the one being worked;
- with the same engraving of the prisms onto plates or conductors with prism shapen said workings allow emissions orthogonal to the light source.

BRIEF DESCRIPTION OF THE DRAWINGS

The present invention will be explained more in detail hereinbelow relating to the enclosed drawings in which some embodiments are shown.

DESCRIPTION OF PREFERRED EMBODIMENTS

The enclosed FIGURES show a cold- and hot-realization process of prisms coined onto methacrylate optic conductors and derived products, performed onto a vertical working centre with a useful run of 1.300 mm and with a reference system that may move the methacrylate bar M without errors of re-placing, allowing to work also onto bars longer tha the machine's run, and onto which an angular head of 90° is mounted which allows a cold-working with a disc miller 1 and then with a circular saw with a diameter of 125 mm, modified at 100°, and to polish with cbn (borazon) grinding-wheel for allowing a wall of parallel optic prisms 2, realized onto a bar M, as specular as possible.

In a possible variant, the coupling of n constant pitch millers may be introduced for increasing the industrial production times, with the following milling parameters:

| revolutions | s = 470 rev/min |
|---|---|
| advancing | f = 370 mm/min |

These parameters have been determined by way of experiment so as to avoid micro-vibrations of the miller that might make the surface of the micro-prisms not perfectly plane and bright: without this condition, the efficiency of the device experiences a drastic falling off.

Figure 1:
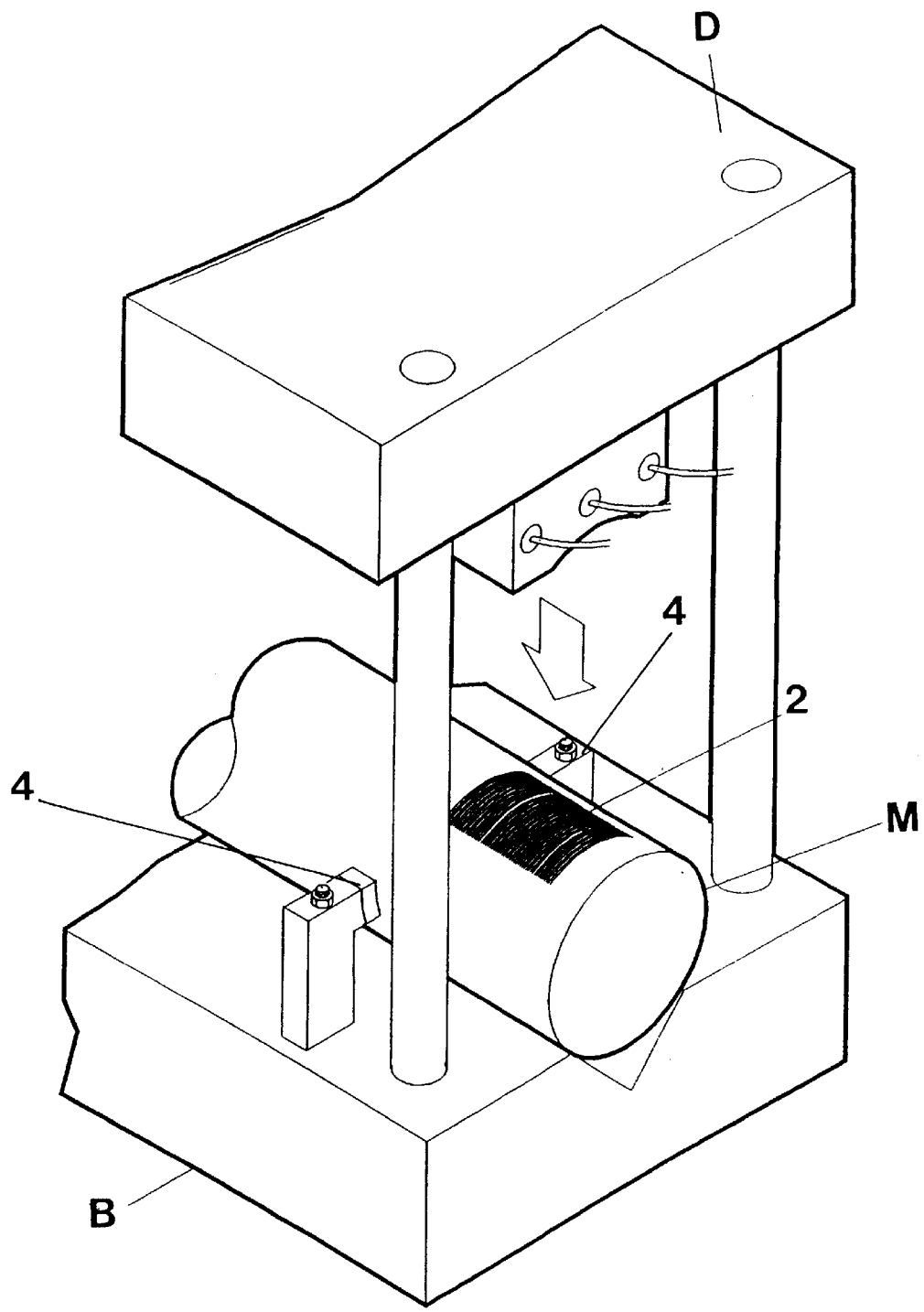
FIGS. 1 and 2 show an axonometric view of a device for the hot-realization of two variants of the process according to the present invention.
Figure 2:
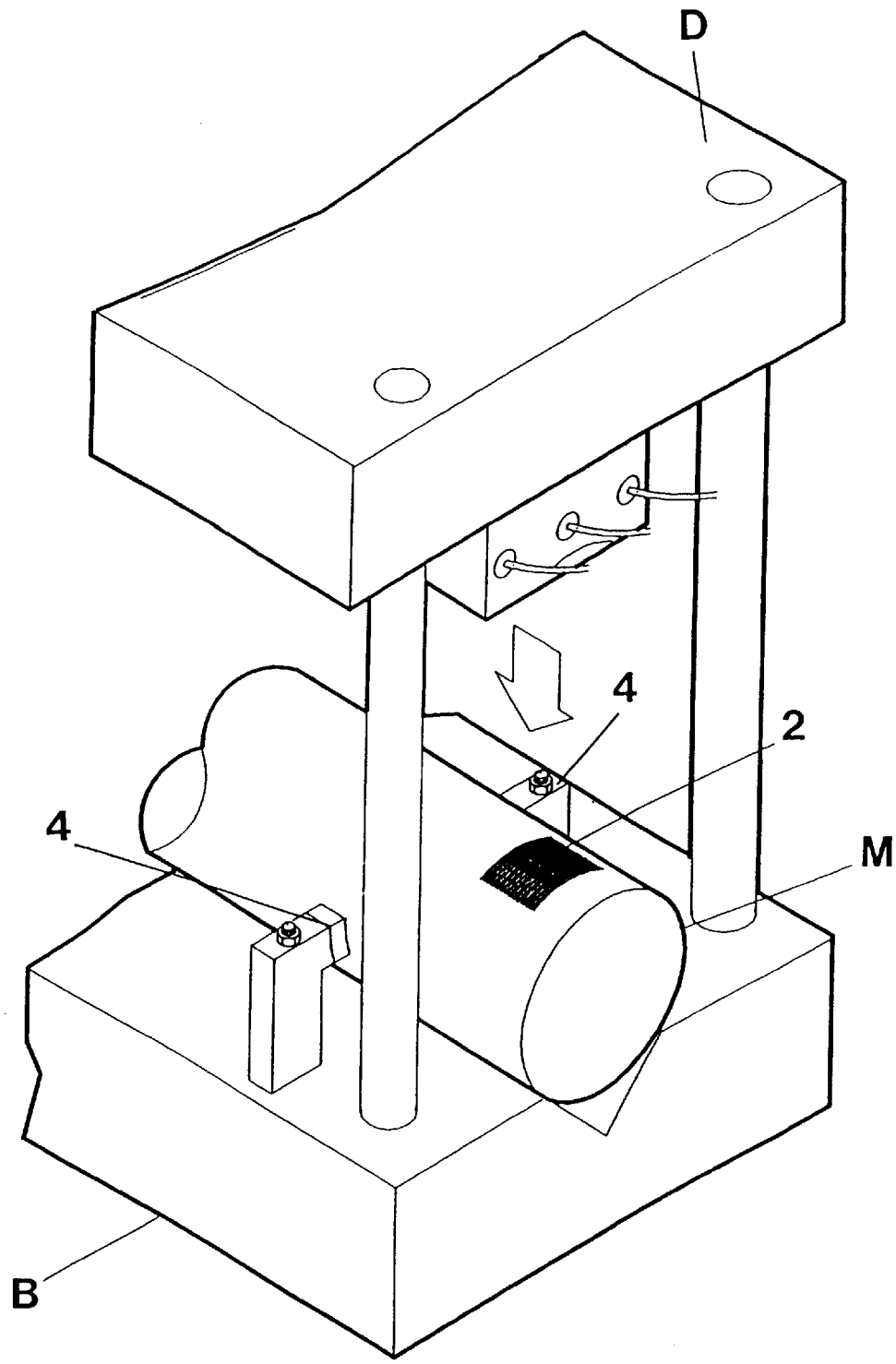
Figure 3:
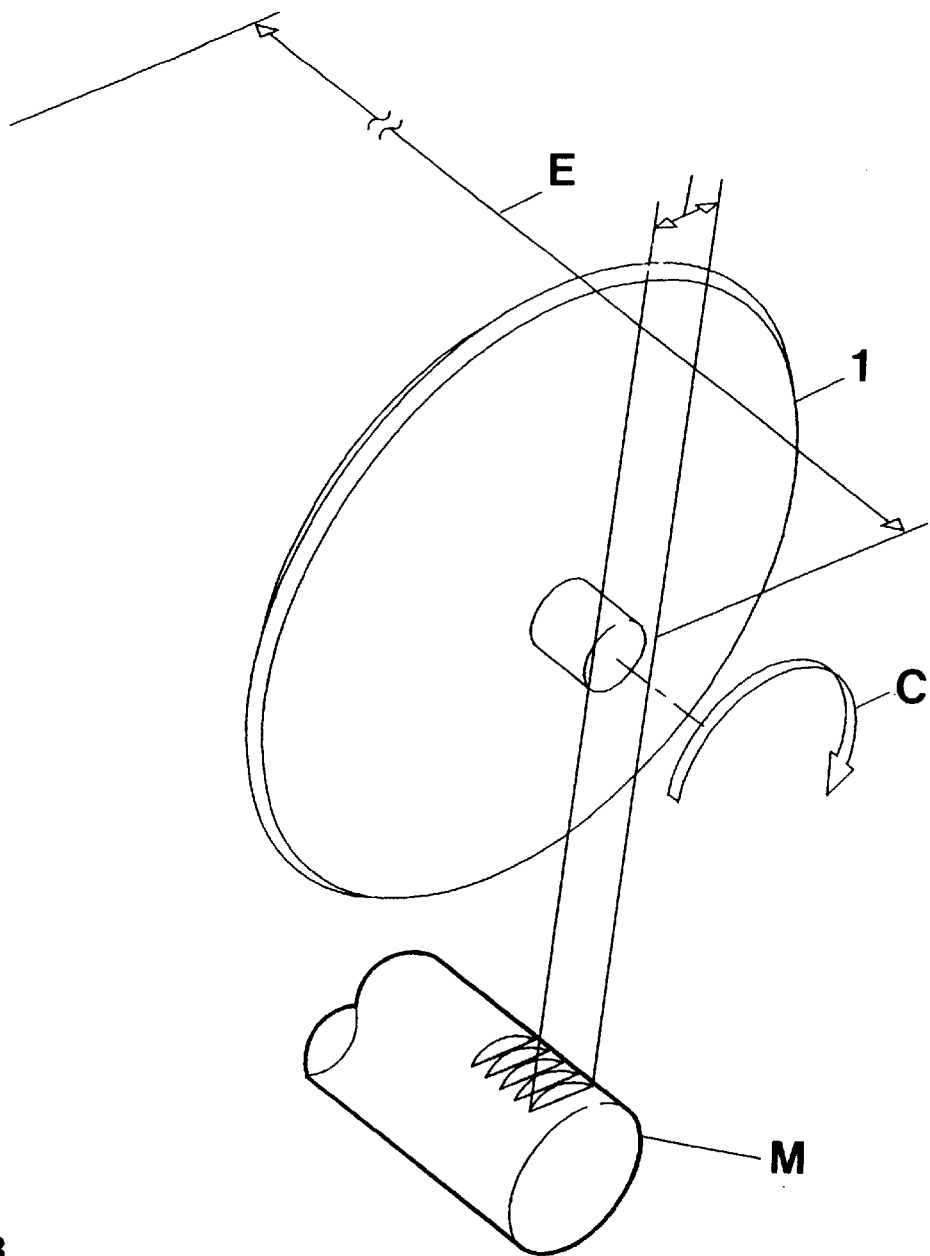
FIGS. 3 and 4 show the miller for the cold-realization of prisms with emission angles of 30° and 56°, onto methacrylate bars M.
Figure 4:
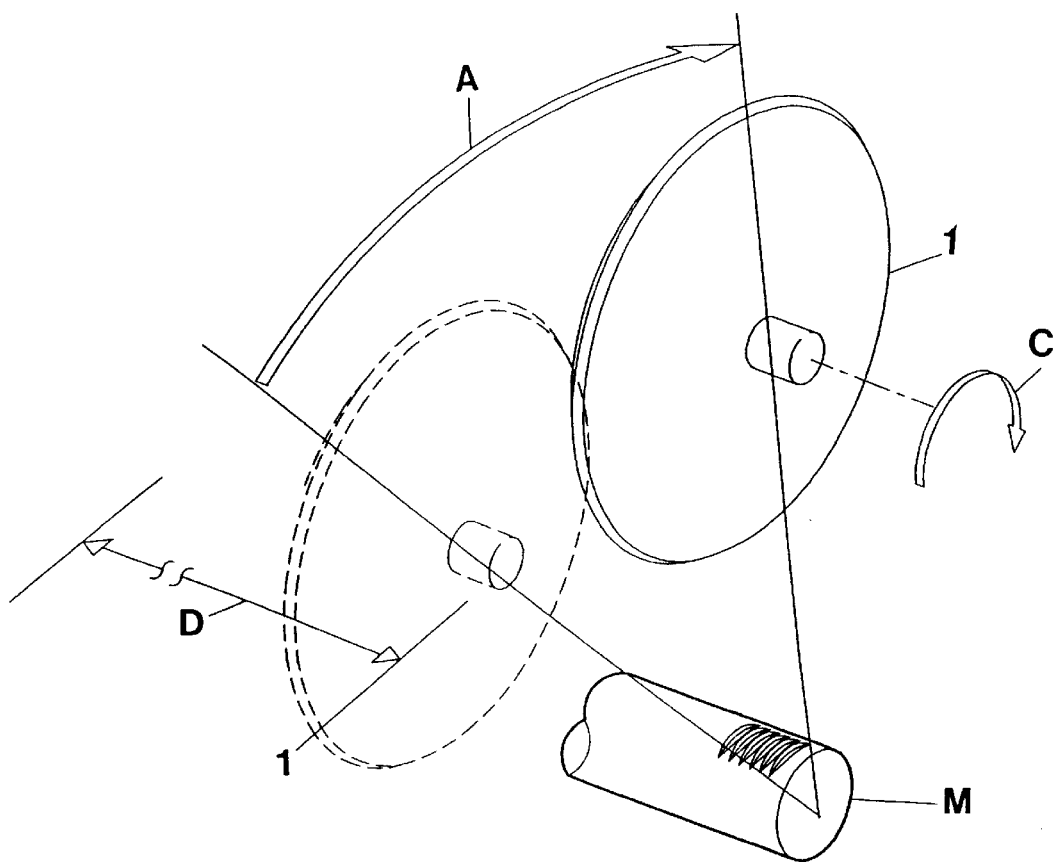
Figure 5:
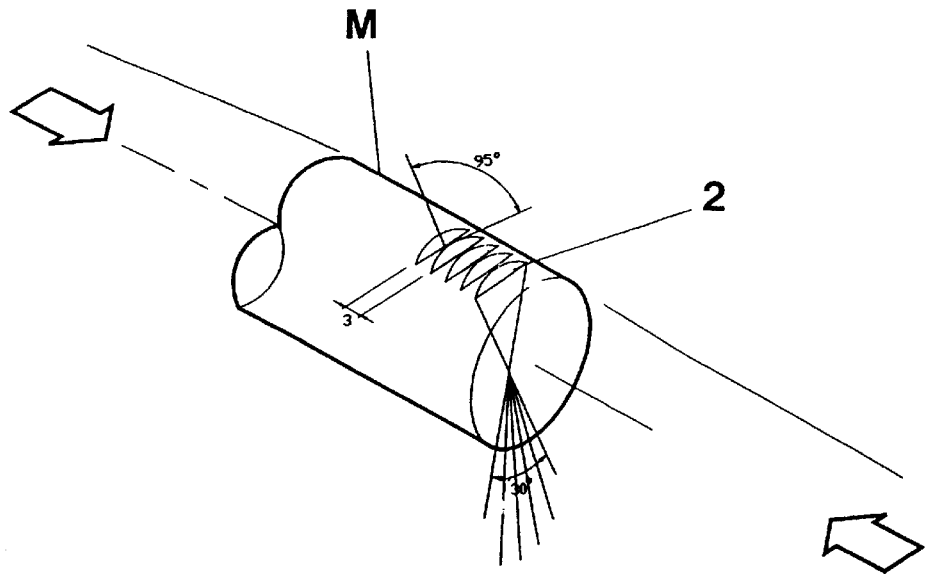
FIGS. 5, 6, 7 and 8 show some variants of methacrylate bars worked according to the present invention, with prisms characterized in emission angles of 30° and 56° and with great arrows showing the light inlets.
Figure 6:
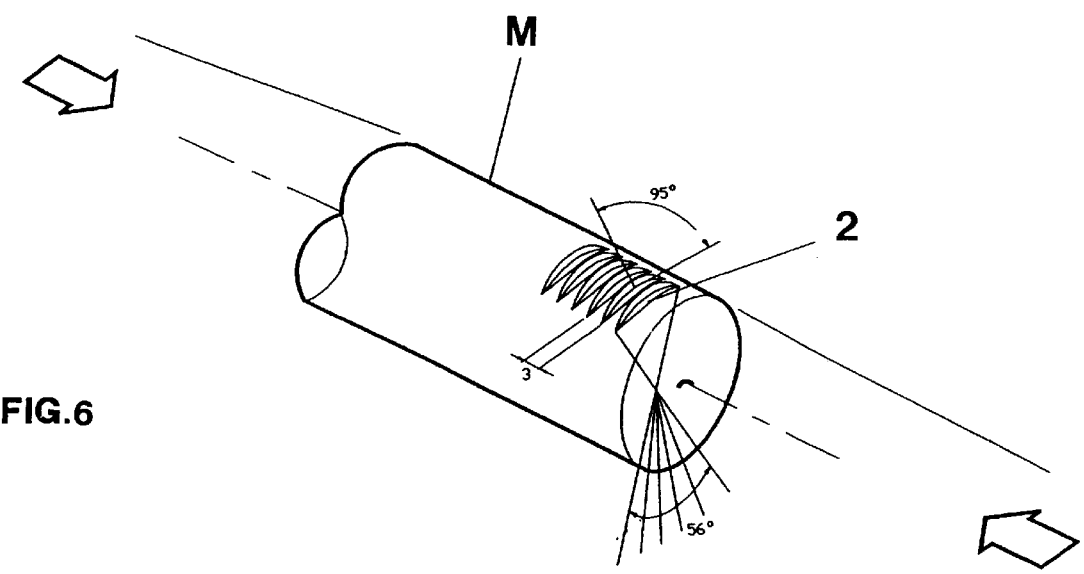
Figure 7:
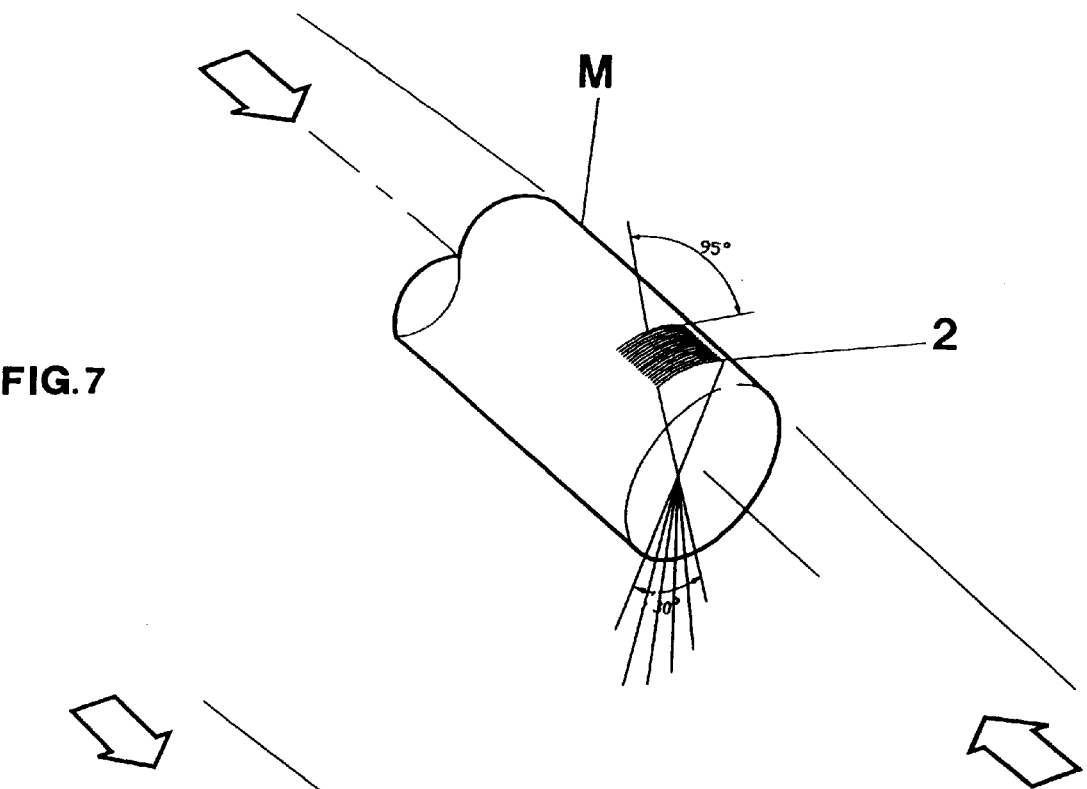
Figure 8:
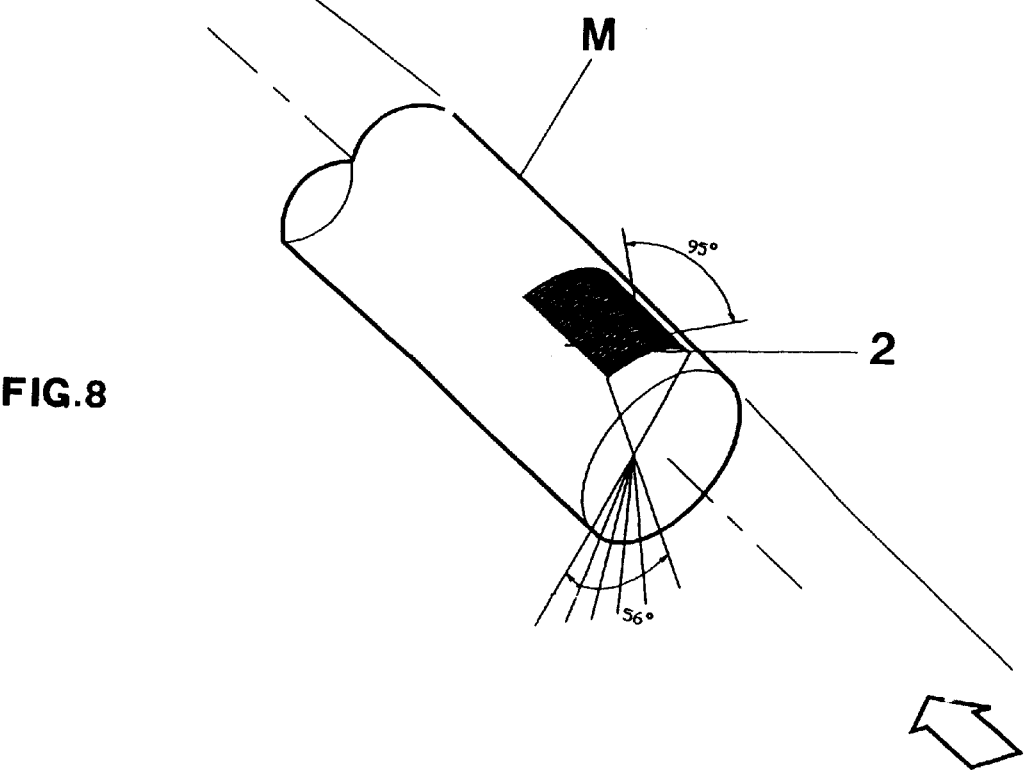

Besides the already described details, FIGS. 3 and 4 furthermore slow the rotation sense C of miller 1 and its excursions D,E and A—respectively longitudinal, vertical and angular—of said miller.

For what concerns the process for the realization of the methacrylate optic conductor by means of hot-working, the methacrylate bar M is placed onto a tool-carrying structure D, fixed to the base B by means of supports 4 for allowing the contact with said bar and the vertical sliding of the tool, consisting of a copper parallelepiped crossed inside by resistances and thermostats which allow the controlled heating thereof, and of an engraving area that engraves the micro-prisms 2 onto the bar.

The vertical descent of the tool is controlled by a comparator which determines the exact depth of the prisms and produces an engraving in a section of 500 mm length so as to allow a horizontal excursion controlled by stops which determine the pitch of the new prisms which are to be coined onto the methacrylate.

According to the present invention, prisms 2 realized onto the methacrylate bars M may be different kinds, according to the amplitude of the light emission to be obtained. Even if—in theory—it is possible to realize workings which may obtain emissions until 180° amplitude, the industry produces two kinds of prisms, which determine respectively the amplitude of 30° and 56°:

- for the emission angle of 30°, the prisms are obtained by means of a miller with 125 mm diameter and forty teeth; the advancing of the miller takes place with a linear movement, touching the surface of the methacrylate bar, as shown in FIG. 3, so as to determine a prism-like engraving with 1.25 mm depth and 12 mm length; the faces of the obtained prism are at an angle of 95° and the pitch is of 3 mm, as such angle allows the light beam introduced into the optic conductor to be totally reflected inside the same, according to angles continued in the limit, total internal reflection angle, and such as to allow the emission according to a beam emission of 30° from the conductor section opposite to the worked one;
- for the 56° emission angle, the prisms are obtained by means of a miller with 125 mm diameter and forty teeth; the advancing of the miller takes place with a revolution movement around the methacrylate bar, as shown in FIG. 4, such as to determine a prism-shaped engraving onto a circular section, 1.25 mm deep and 19.1 mm long, so that said angle allows the light beam introduced into the optic conductor to be totally reflected inside the same according to angles contained in the internal total reflection limit angle and such as to allow the emission according to beam angle of 56° from the section of the conductor opposite to the worked one.

What is claimed is:

1. A method of forming a plurality of prisms in a surface of a methacrylate optic conductor, the method comprising the steps of:

selecting an angular width of a light beam to be transmitted from a side of the methacrylate optic conductor opposite a side of the methacrylate optic conductor in which the plurality of prisms are to be formed;

determining a first depth and a first length of the plural prisms in the methacrylate optic conductor that will cause the light beam to have the selected angular width when light is conducted through the methacrylate optic conductor;

placing the methacrylate optic conductor in a tool-carrying structure that includes a tool that is one of a constant pitch miller for cold cutting the methacrylate optic conductor and a hot-working device for heat embossing the methacrylate optic conductor;

moving the tool into the methacrylate optic conductor to create plural notches that each have the first depth, the first length, and a planar surface transverse to a longitudinal axis of the methacrylate optic conductor by controlling movement of the tool with a comparator that determines a distance to which the tool has advanced into the methacrylate optic conductor; and polishing the planar surfaces to form the plural prisms.

2. The method of claim 1, wherein the tool is moved linearly in a direction generally perpendicular to the longitudinal axis of the methacrylate optic conductor.

3. The method of claim 2, wherein the angular width is 30°, the tool is circular with a diameter of 125 mm, the first length of 12 mm, and the first depth is 1.25 mm.

4. The method of claim 1, wherein the tool is moved circularly around the methacrylate optic conductor angular in a plane generally perpendicular to the longitudinal axis of the methacrylate optic conductor.

5. The method of claim 4, wherein the angular width is 56°, the tool is circular with a diameter of 125 mm, the first length of about 19 mm, and the first depth is 1.25 mm.

* * * * *